(12) United States Patent
Shiga et al.

(10) Patent No.: US 10,673,240 B2
(45) Date of Patent: Jun. 2, 2020

(54) POWER CONTROL APPARATUS, POWER CONTROL METHOD, AND RECORDING MEDIUM

(71) Applicant: KABUSHIKI KAISHA TOSHIBA, Minato-ku (JP)

(72) Inventors: Yoshiaki Shiga, Kawasaki (JP); Hiromasa Shin, Yokohama (JP); Mitsuru Kakimoto, Kawasaki (JP); Kenji Kawamata, Ota (JP); Yasuhiro Ogura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 180 days.

(21) Appl. No.: 15/918,435

(22) Filed: Mar. 12, 2018

(65) Prior Publication Data

US 2019/0148944 A1    May 16, 2019

(30) Foreign Application Priority Data

Nov. 15, 2017 (JP) .................. 2017-220364

(51) Int. Cl.
*H02J 3/32* (2006.01)
*H02J 7/00* (2006.01)
(Continued)

(52) U.S. Cl.
CPC ................ *H02J 3/32* (2013.01); *G01W 1/10* (2013.01); *G05B 13/048* (2013.01);
(Continued)

(58) Field of Classification Search
CPC .. H02J 3/32; H02J 7/0068; H02J 9/061; H02J 2003/003; H02J 2003/007; G05B 2219/2639; G05B 13/048; G01W 1/10
See application file for complete search history.

(56) References Cited

U.S. PATENT DOCUMENTS 9,727,036 B2    8/2017  Taniguchi et al.
9,819,222 B2   11/2017  Yamaguchi et al.
(Continued)

FOREIGN PATENT DOCUMENTS

JP          5687349       3/2015
JP       2016-15857 A    1/2016
(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A power control apparatus has a peak cut prediction unit that predicts a period of time to impose a restriction on power supply from a power system to a consumer based on a predetermined condition, a threshold setting unit that sets a predetermined threshold such that a power supply amount from the power system to the consumer does not exceed the threshold in the period of time predicted by the peak cut prediction unit, and a charge/discharge control command unit that stops power supply from the power system to the consumer and causes a power storage device to be discharged by an amount of demand power exceeding the threshold when demand power of the consumer reaches the threshold in the period of time predicted by the peak cut prediction unit.

20 Claims, 8 Drawing Sheets

(51) Int. Cl.
*H02J 9/06* (2006.01)
*G01W 1/10* (2006.01)
*G05B 13/04* (2006.01)
*H02J 3/00* (2006.01)

(52) U.S. Cl.
CPC ............ *H02J 7/0068* (2013.01); *H02J 9/061* (2013.01); *G05B 2219/2639* (2013.01); *H02J 3/003* (2020.01); *H02J 2203/20* (2020.01)

(56) References Cited

U.S. PATENT DOCUMENTS

| | | |
|---|---|---|
| 9,866,020 B2 | 1/2018 | Miyazaki et al. |
| 2014/0225445 A1 | 8/2014 | Hanada |
| 2015/0340900 A1* | 11/2015 | Sugimoto ................ H02J 3/14 |
| | | 320/134 |
| 2016/0043594 A1* | 2/2016 | Yamaguchi ............... H02J 3/14 |
| | | 307/24 |
| 2016/0172899 A1 | 6/2016 | Taniguchi et al. |
| 2016/0209857 A1 | 7/2016 | Nakasone |
| 2018/0331537 A1* | 11/2018 | Watanabe ................ H02J 3/14 |

FOREIGN PATENT DOCUMENTS

| | | |
|---|---|---|
| JP | 6142925 | 6/2017 |
| JP | 6145722 | 6/2017 |
| WO | WO 2013/038483 A1 | 3/2013 |
| WO | WO 2013/136419 A1 | 9/2013 |
| WO | WO 2014/136353 A1 | 9/2014 |
| WO | WO 2014/203478 A1 | 12/2014 |
| WO | WO 2014/208059 A1 | 12/2014 |
| WO | WO 2015/004849 A1 | 1/2015 |
| WO | WO 2015/033461 A1 | 3/2015 |

* cited by examiner

POWER CONTROL APPARATUS, POWER CONTROL METHOD, AND RECORDING MEDIUM

CROSS REFERENCE TO RELATED APPLICATIONS

This application is based upon and claims the benefit of priority from the prior Japanese Patent Application No. 2017-220364, filed on Nov. 15, 2017, the entire contents of which are incorporated herein by reference.

FIELD

A disclosure relates to a power control apparatus, a power control method, and a recording medium.

BACKGROUND

In some countries such as Japan, an electricity charge is calculated based on a basic charge, an electric energy charge generated according to a used power amount, a renewable energy levy, and the like. Among them, the basic charge may be calculated based on the use amount every 30 minutes when the amount of power usage is the largest in a year. Thus, when it is desired to lower the basic charge, it is necessary to perform a peak cut that reduces the amount of power usage in a (peak) period of time in which the amount of power usage is the largest in the year. With such a background, there has been proposed a power control apparatus that executes power saving, discharge using a power storage device, or the like during a period in which the amount of power usage is likely to peak and performs the peak cut to reduce a basic charge.

When the peak cut operation is performed by the discharge of the power storage device, it is general to set a threshold for power supplied from a power system and perform control such that a peak of the supplied power within a predetermined period (for example, 30 minutes) does not exceed the threshold.

However, if the threshold is too high, the discharge from the power storage device is hardly performed so that the frequency of obtaining the effect of the peak cut decreases. On the other hand, if the threshold is too low, the power storage device is discharged more than necessary, and the storage capacity of the power storage device becomes empty during the period of time that needs to be subjected to the peak cut so that it is difficult to perform the discharge and the peak cut. Thus, it is necessary to set an optimum threshold in accordance with the storage capacity of the power storage device.

In addition, if the power storage device is frequently discharged to unnecessarily perform the peak cut despite the fact that dates on which the peak cut needs to be performed are inherently limited, deterioration of the power storage device is accelerated because the number of times of charge/discharge of the power storage device increases. In addition, if a battery is occupied to perform battery control for the peak cut, it is difficult to use the battery as an emergency power supply for virtual power plant (VPP) or business continuity planning (BCP), or the like, other than the peak cut operation.

DETAILED DESCRIPTION

According to one embodiment, a power control apparatus has a peak cut prediction unit that predicts a period of time to impose a restriction on power supply from a power system to a consumer based on a predetermined condition, a threshold setting unit that sets a predetermined threshold such that a power supply amount from the power system to the consumer does not exceed the threshold in the period of time predicted by the peak cut prediction unit, and a charge/discharge control command unit that stops power supply from the power system to the consumer and causes a power storage device to be discharged by an amount of demand power exceeding the threshold when demand power of the consumer reaches the threshold in the period of time predicted by the peak cut prediction unit.

Hereinafter, an embodiment will be described with reference to the drawings. In the present specification and accompanying drawings, the description and illustration are given by omitting, changing, or simplifying some components for ease of understanding and convenience in illustration, but technical contents at the extent with which similar functions can be expected are also interpreted as being included in the embodiment.

Figure 1:
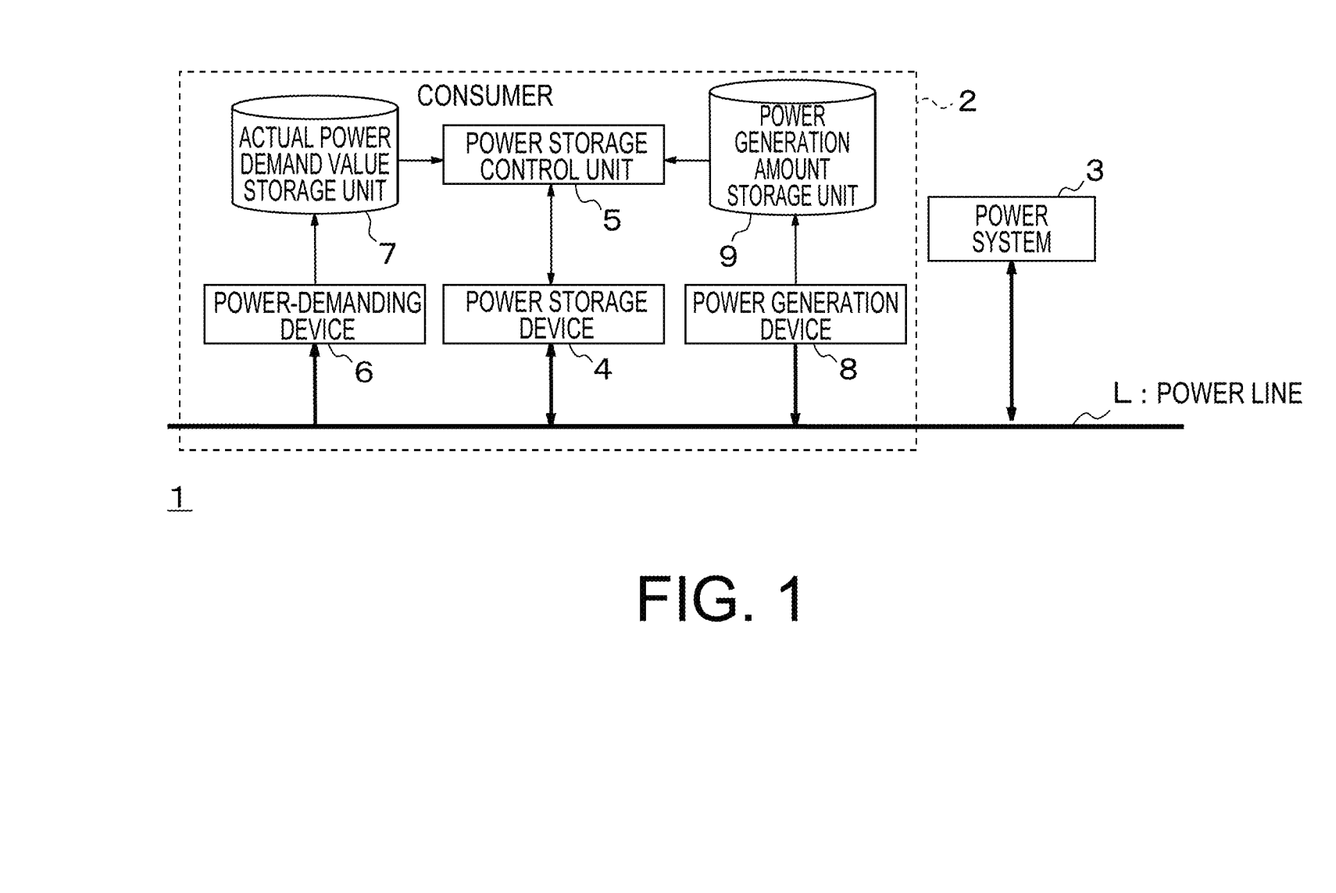
FIG. 1 is a block diagram illustrating a schematic configuration of a power control apparatus.

FIG. 1 is a block diagram illustrating a schematic configuration of a power control apparatus 1. The power control apparatus 1 includes each power consumer 2. The power control apparatus 1 is connected to a power line L, and system power is supplied to the power line L from a power system 3. FIG. 1 illustrates the power control apparatus 1 corresponding to the single consumer 2. In practice, a plurality of the power control apparatuses 1 corresponding to a plurality of the consumers 2 are connected to the common power line L.

The power control apparatus 1 in FIG. 1 includes a power storage device 4, a power storage control unit 5, a power-demanding device 6, an actual power demand value storage unit 7, a power generation device 8, and a power generation amount storage unit 9. Among them, the power generation device 8 and the power generation amount storage unit 9 are not indispensable, and thus, may be omitted.

The power storage device 4 is a secondary battery that can be charged and discharged, and is a lithium ion battery, a lead storage battery, or the like. Incidentally, the power storage device 4 may be various energy storage devices that store mechanical energy or chemical energy, convert the stored energy into electric signals, and output the electric signals.

The power-demanding device 6 is an electric device used by each of the consumers 2, and there is no limit on a specific type or number of the electric device. The actual power demand value storage unit 7 stores an actual power demand value used by the power-demanding device 6 together with time information. When there are a plurality of power-demanding devices 6, the actual power demand value storage unit 7 stores actual power demand values of all the power-demanding devices 6.

The power generation device 8 may be a power generation device 8 using natural energy, for example, a solar battery, a wind power generator, or the like, or may be a power generation device 8 using regenerative energy. The power generation amount storage unit 9 stores a power generation amount generated by the power generation device 8 together with time information.

Power from the power system 3, power discharged from the power storage device 4, and power generated by the power generation device 8 are all supplied to the power line L. The power used by the power-demanding device 6 is equal to the total amount of the power supplied from the power system 3, the power storage device 4, and the power generation device 8 to the power line L are, thereby maintaining supply-demand balance.

The power storage control unit 5 controls charge/discharge of the power storage device 4. More specifically, the power storage control unit 5 outputs a control command signal to the power storage device 4 based on data stored in the actual power demand value storage unit 7 and the power generation amount storage unit 9.

Figure 2:
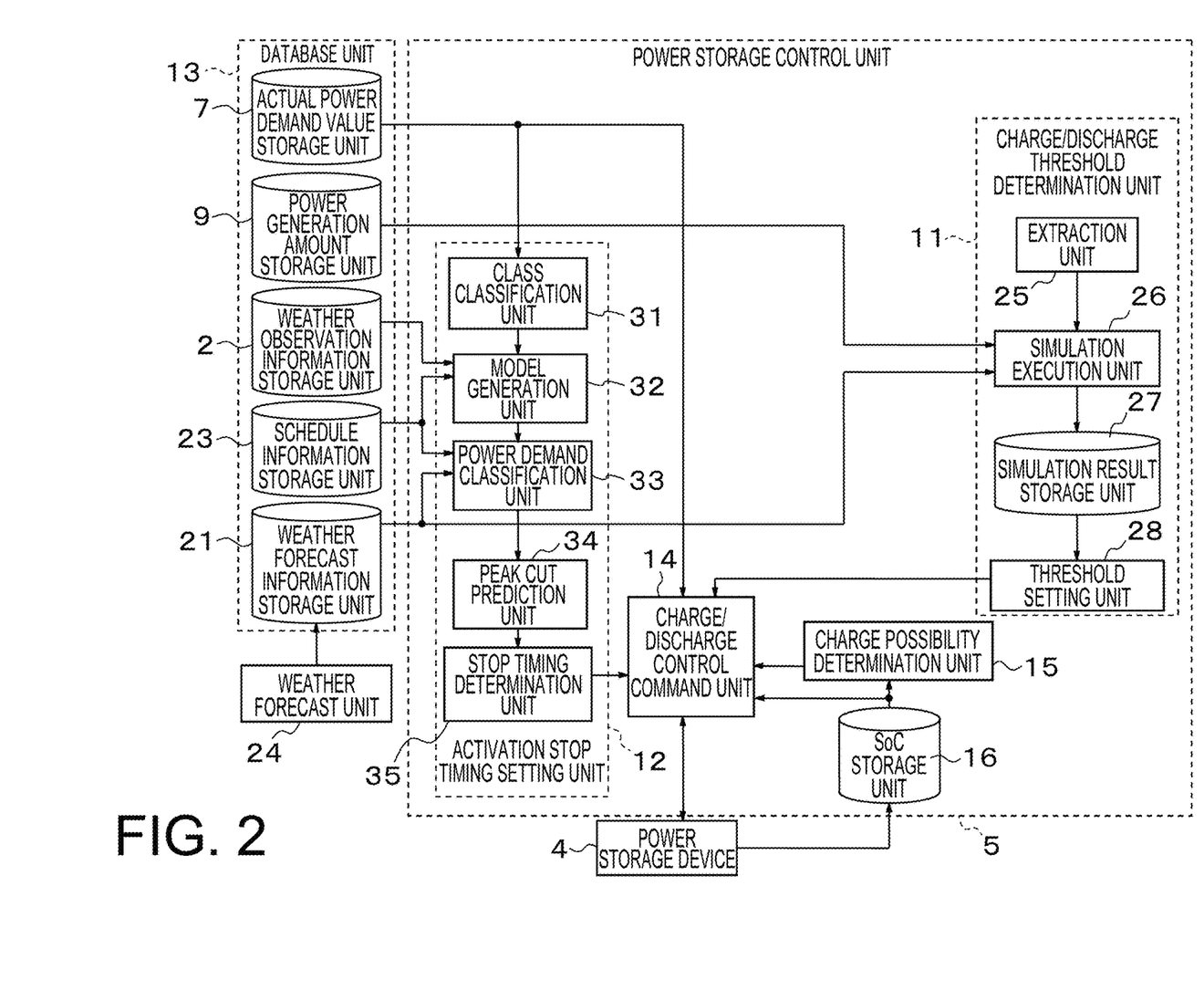
FIG. 2 is a block diagram illustrating an example of an internal configuration of a power storage control unit.

FIG. 2 is a block diagram illustrating an example of an internal configuration of the power storage control unit 5. The power storage control unit 5 roughly includes a charge/discharge threshold determination unit 11, an activation stop timing setting unit 12, a database unit 13, a charge/discharge control command unit 14, a charge possibility determination unit 15, and a state of charge (SoC) storage unit 16. The charge/discharge threshold determination unit 11 sets a threshold at which the power storage device 4 starts charge or discharge. The activation stop timing setting unit 12 sets an activation stop timing to stop control of a peak cut operation of the power storage device 4. The database unit 13 stores various types of information to be used by the charge/discharge threshold determination unit 11 and the activation stop timing setting unit 12 although not indispensable components.

For example, the database unit 13 includes the actual power demand value storage unit (a first storage unit) 7, a weather forecast information storage unit (a second storage unit) 21, the power generation amount storage unit (a third storage unit) 9, a weather observation information storage unit (a fourth storage unit) 22, and a schedule information storage unit (a fifth storage unit) 23.

The weather forecast information storage unit 21 stores weather forecast information forecasted by a weather forecast unit 24 together with time information. The weather forecast unit 24 is not necessarily provided inside the power control apparatus 1, and the weather forecast information acquired from the outside of the power control apparatus 1 may be stored in the weather forecast information storage unit 21 via a communication network or the like.

The weather observation information storage unit 22 stores weather observation information actually observed using a temperature sensor, a humidity sensor, and the like (not illustrated). The schedule information storage unit 23 stores power demand schedule information of the consumer 2. Here, the power demand schedule information is information such as a period of time, a day of a week, and a holiday when the consumer 2 operates the power-demanding device 6. The power demand schedule information is also referred to as calendar information.

The charge/discharge threshold determination unit 11 includes an extraction unit 25, a simulation execution unit 26, a simulation result storage unit 27, and a threshold setting unit 28.

The extraction unit 25 extracts some actual power demand values with newer time information from among the actual power demand values stored in the actual power demand value storage unit 7. More specifically, the extraction unit 25 extracts actual power demand values within a period during which a tendency of the most recent power demands from the consumer 2 can be grasped. For example, the power demand has a great influence on human activities, and ordinary humans repeat similar activities in a cycle of one week. Thus, the extraction unit 25 may extract actual power demand values corresponding to the most recent one week.

The simulation execution unit 26 simulates an operation of causing the power storage device 4 to be charged or discharged such that the power supply amount from the power system 3 to the consumer 2 does not exceed the threshold, based on some actual power demand values extracted by the extraction unit 25 and the weather forecast information stored in the weather forecast information storage unit 21. The simulation execution unit 26 may execute a plurality of simulations by setting initial values for each of a plurality of cases, for example, with different weather forecast information (for example, cases with different temperatures). With such simulation, it is possible to grasp how a peak cut effect changes when the threshold is changed. The simulation result storage unit 27 stores an execution result obtained by the simulation execution unit 26.

The threshold setting unit 28 sets the threshold based on the execution result of simulation performed by the simulation execution unit 26. For example, the threshold setting unit 28 sets the threshold to obtain opportunities capable of obtaining the peak cut effect as many as possible and to be capable of suppressing deterioration of the power storage device 4 as much as possible.

The activation stop timing setting unit 12 includes a class classification unit 31, a model generation unit 32, a power demand classification unit 33, a peak cut prediction unit 34, and a stop timing determination unit 35.

The class classification unit 31 classifies power demands of the consumer 2 into a plurality of classes. For example, the class is used to classify demand power into a plurality of periods of time for different magnitudes. The demand power may be classified into a plurality of temperatures instead of being classified into the plurality of periods of time.

The model generation unit 32 generates a plurality of information models to predict a power demand amount of the consumer 2 in association with the plurality of classes, based on the weather observation information and the power demand schedule information of the consumer 2. The power demand classification unit 33 classifies the power demand amount of the consumer 2 in the future into the plurality of classes based on the power demand schedule information of the consumer 2, the weather forecast information, and the plurality of information models.

The peak cut prediction unit 34 predicts a period of time to impose a restriction on power supply from the power system 3 to the consumer 2 based on a predetermined condition. More specifically, the peak cut prediction unit 34 predicts the period of time to impose the restriction on the power supply from the power system 3 to the consumer 2, based on the power demand amount classified by the power demand classification unit 33. The threshold setting unit 28 sets a threshold such that the power supply amount from the power system 3 to the consumer 2 does not exceed the predetermined threshold in the period of time predicted by the peak cut prediction unit 34.

The stop timing determination unit 35 determines whether a charge/discharge stop timing of the power storage device 4 has arrived, based on the period of time predicted by the peak cut prediction unit 34.

When the demand power of the consumer 2 reaches the threshold in the period of time predicted by the peak cut prediction unit 34, the charge/discharge control command unit 14 stops the power supply from the power system 3 to the consumer 2 and causes the power storage device 4 to be discharged by the amount of the demand power exceeding the threshold. More specifically, the charge/discharge control command unit 14 permits charge/discharge of the power storage device 4 in the period of time predicted by the peak cut prediction unit 34, and stops charge/discharge of the power storage device 4 at a time other than the period of time.

The charge possibility determination unit 15 determines whether charge of the power storage device 4 is possible when the demand power of the consumer 2 is equal to or less than the threshold in the period of time predicted by the peak cut prediction unit 34. The charge/discharge control command unit charges the power storage device 4 when the charge possibility determination unit 15 determines that the charge of the power storage device 4 is possible.

The SoC storage unit 16 stores information on a charge/discharge state of the storage battery (hereinafter referred to as SoC information). The SoC storage unit 16 may be provided outside the power storage control unit 5, for example, inside the power storage device 4.

Figure 3A:
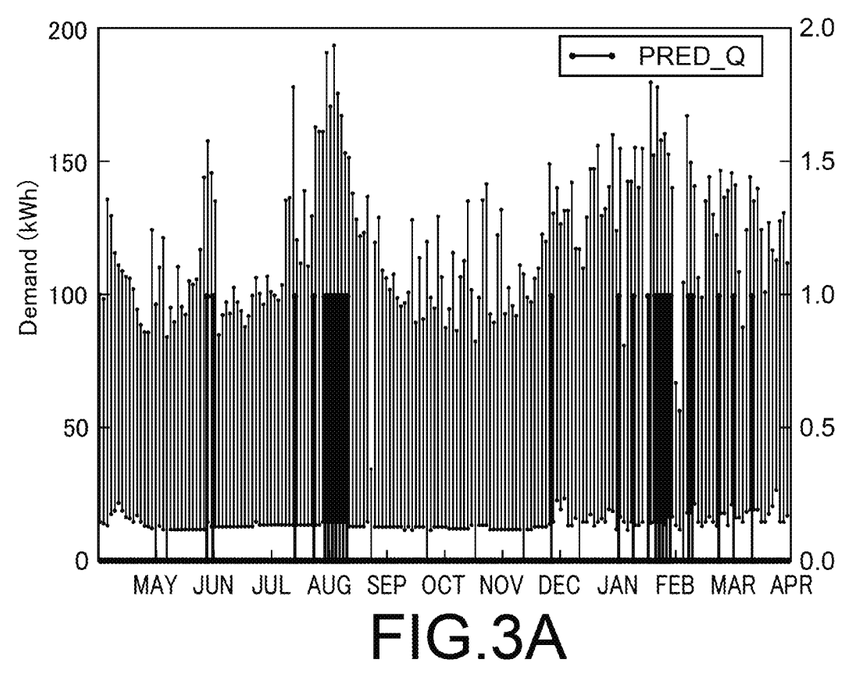
FIG. 3A is a graph illustrating a power demand amount for one year and a period of time predicted by a peak cut prediction unit.

FIG. 3A is a graph illustrating a power demand amount for one year and a period of time predicted by the peak cut prediction unit 34. In FIG. 3A, the horizontal axis represents a month and the vertical axis represents the power demand amount (kWh). In the example of FIG. 3A, the power demand amount peaks in August when a cooling frequency is high, and January to March when a heating frequency is high. Thus, the peak cut prediction unit 34 sets a period of time to perform the peak cut of the power supply amount from the power system 3 in accordance with the period during which the power demand amount becomes the peak.

Figure 3B:
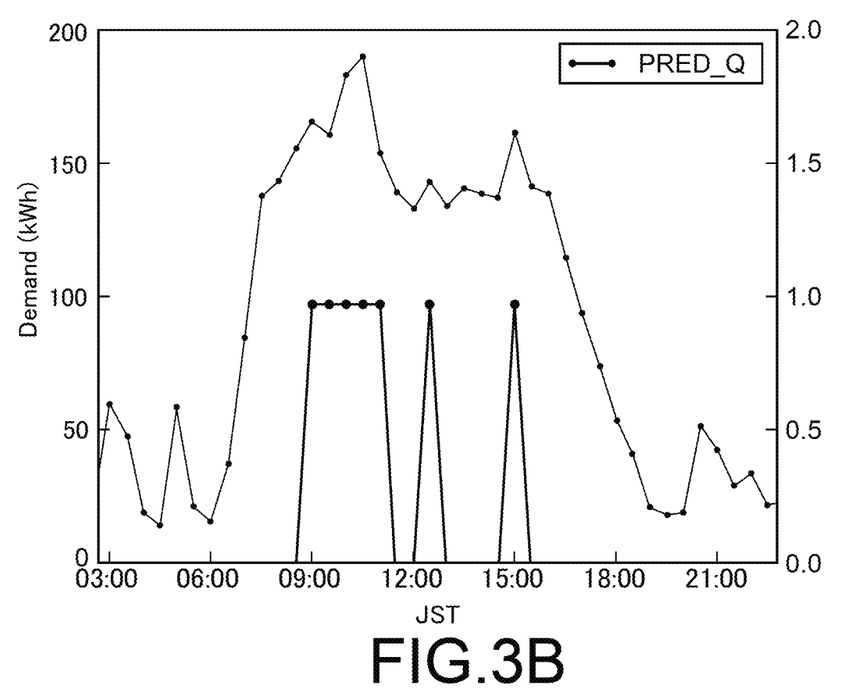
FIG. 3B is a graph illustrating a change in the power demand amount during a day of a certain month.

FIG. 3B is a graph illustrating a change in the power demand amount during a day of a certain month. In FIG. 3B, the horizontal axis represents the Japan standard time (JST) and the vertical axis represents the power demand amount (kWh). As illustrated in FIG. 3B, the power demand amount greatly changes depending on a period of time even within a day. In the example of FIG. 3B, the power demand amount peaks in the morning, 12:00 to 13:00 in daytime, and around 15:00, and thus, the peak cut prediction unit 34 sets the period of time to perform the peak cut to these periods of time.

Figure 4:
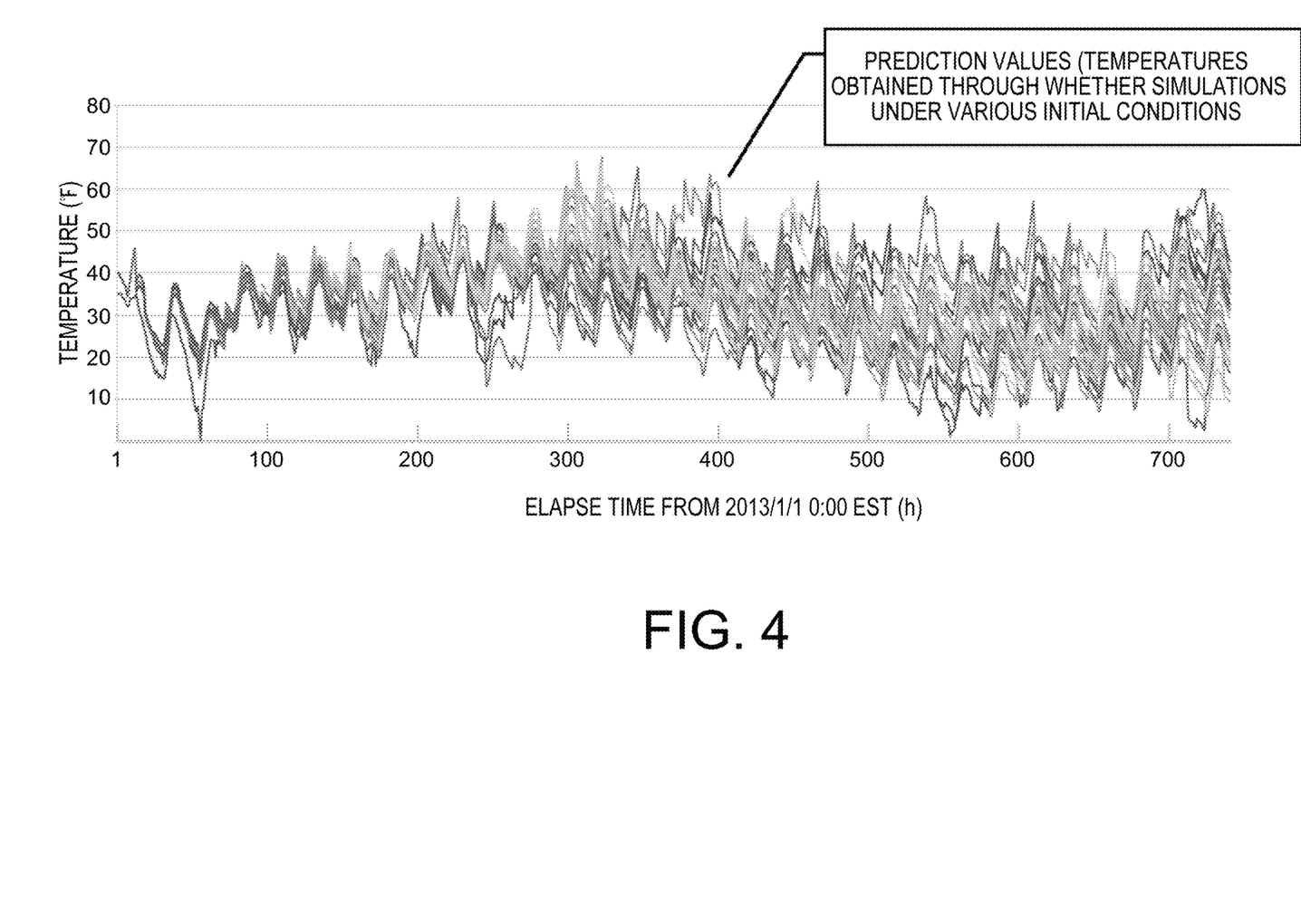
FIG. 4 is a graph illustrating a prediction value of a temperature input to a simulation execution unit in a charge/discharge threshold determination unit.

FIG. 4 is a graph illustrating a prediction value of a temperature input to the simulation execution unit 26 inside the charge/discharge threshold determination unit 11. The graph of FIG. 4 illustrates a temporal change of the prediction value of the temperature obtained through weather simulations under various initial conditions. In FIG. 4, the horizontal axis represents the time and the vertical axis represents the temperature. For example, the simulation execution unit 26 acquires data of the prediction values of temperatures in FIG. 4 under the various initial conditions, and simulates the operation of causing the power storage device 4 to be charged or discharged.

Figure 5A:
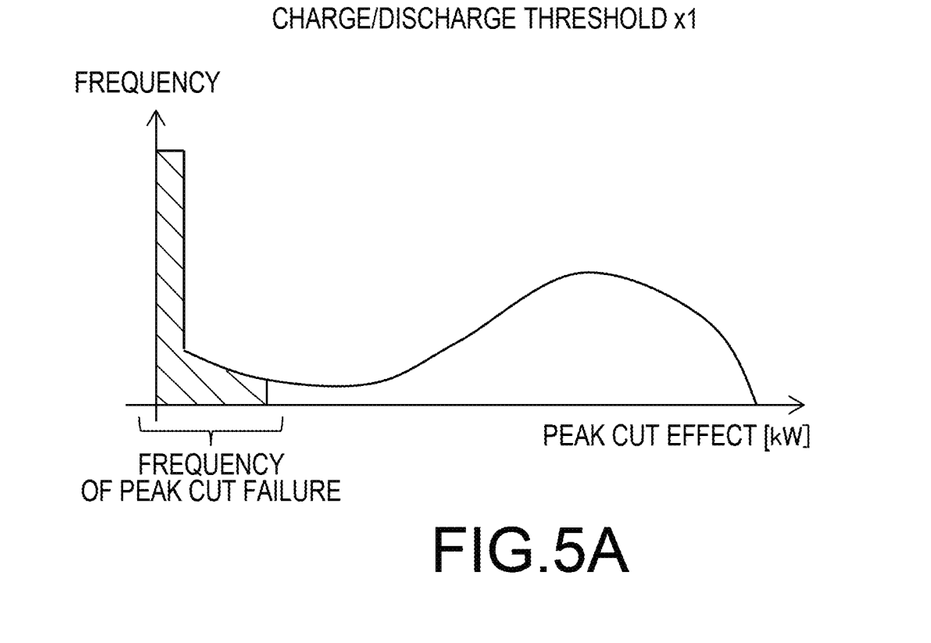
FIG. 5A is a graph illustrating a simulation result in the case of a threshold x1.
Figure 5B:
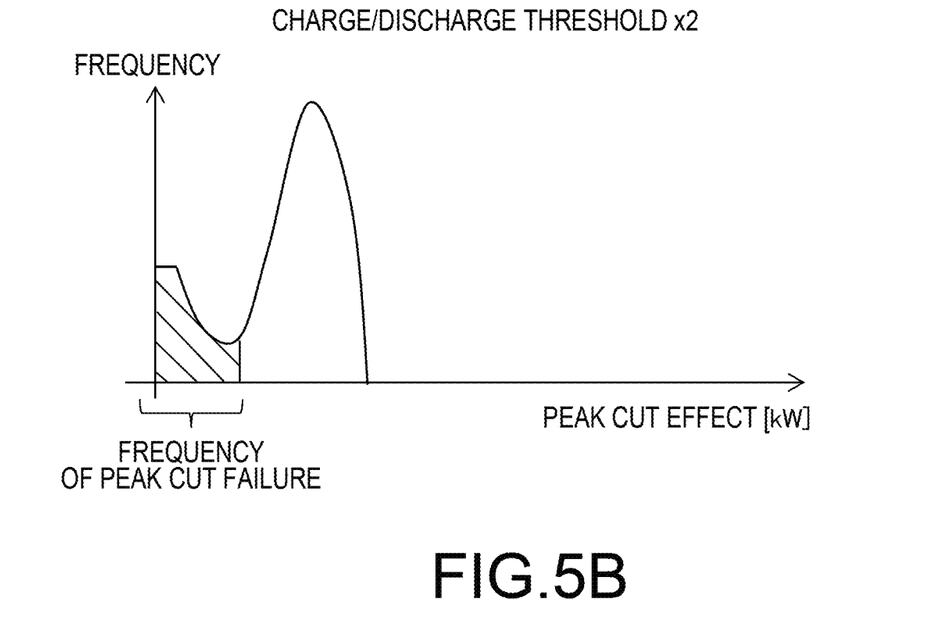
FIG. 5B is a graph illustrating a simulation result in the case of a threshold x2.

FIGS. 5A and 5B are graphs illustrating simulation results of the simulation execution unit 26. In FIG. 5A and FIG. 5B, thresholds set by the threshold setting unit 28 are different in magnitude, and a threshold x1 in FIG. 5A is lower than a threshold x2 in FIG. 5B. In the case of FIG. 5A, the peak cut is performed at a stage where the power supply amount from the power system 3 reaches the threshold x1 that is not so high, and thus, a range of the power demand with which the peak cut effect can be obtained becomes wide. On the other hand, the power storage device 4 more frequently performs discharge, and thus, a frequency at which the storage capacity of the power storage device 4 becomes empty and the discharge is hardly performed, that is, a frequency (a hatched portion in FIG. 5A) at which the peak cut fails increases. On the other hand, in the case of FIG. 5B, the peak cut is performed at a stage where the power supply amount from the power system 3 reaches the threshold x2 that is higher than the threshold x1, and thus, the range of the power demand with which the peak cut effect can be obtained becomes narrow. In addition, since the power storage device 4 less frequently performs discharge, and thus, the possibility (a hatched portion in FIG. 5B) that the storage capacity of the power storage device 4 becomes empty (the peak cut fails) is lower than that in FIG. 5A.

Figure 6:
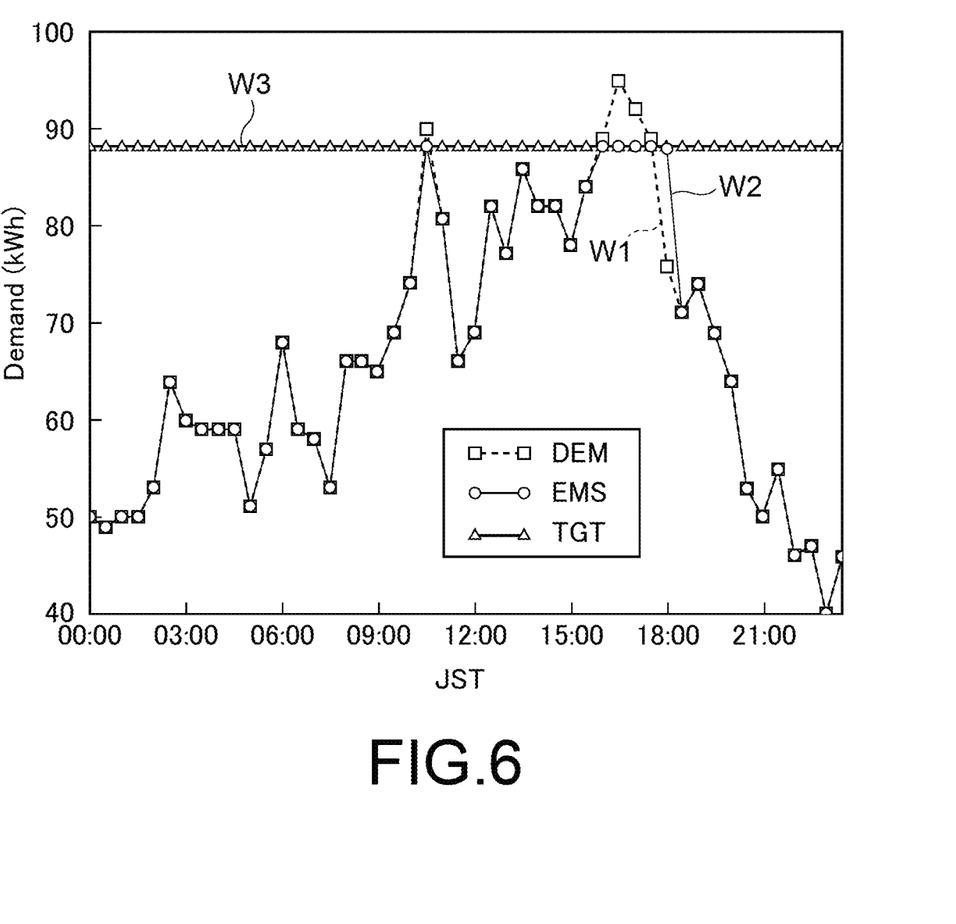
FIG. 6 is a graph illustrating a temporal change in a power supply amount before and after a peak cut.

FIG. 6 is a graph illustrating a temporal change w1 of the power supply amount before the peak cut from the power system 3, a temporal change w2 of the power supply amount after the peak cut, and a threshold w3 for charge/discharge of the power storage device 4. As illustrated in FIG. 6, when the power supply amount reaches the threshold, the power supply amount from the power system 3 is limited to the threshold, and a shortage is compensated by the discharge of the power storage device 4.

Figure 7:
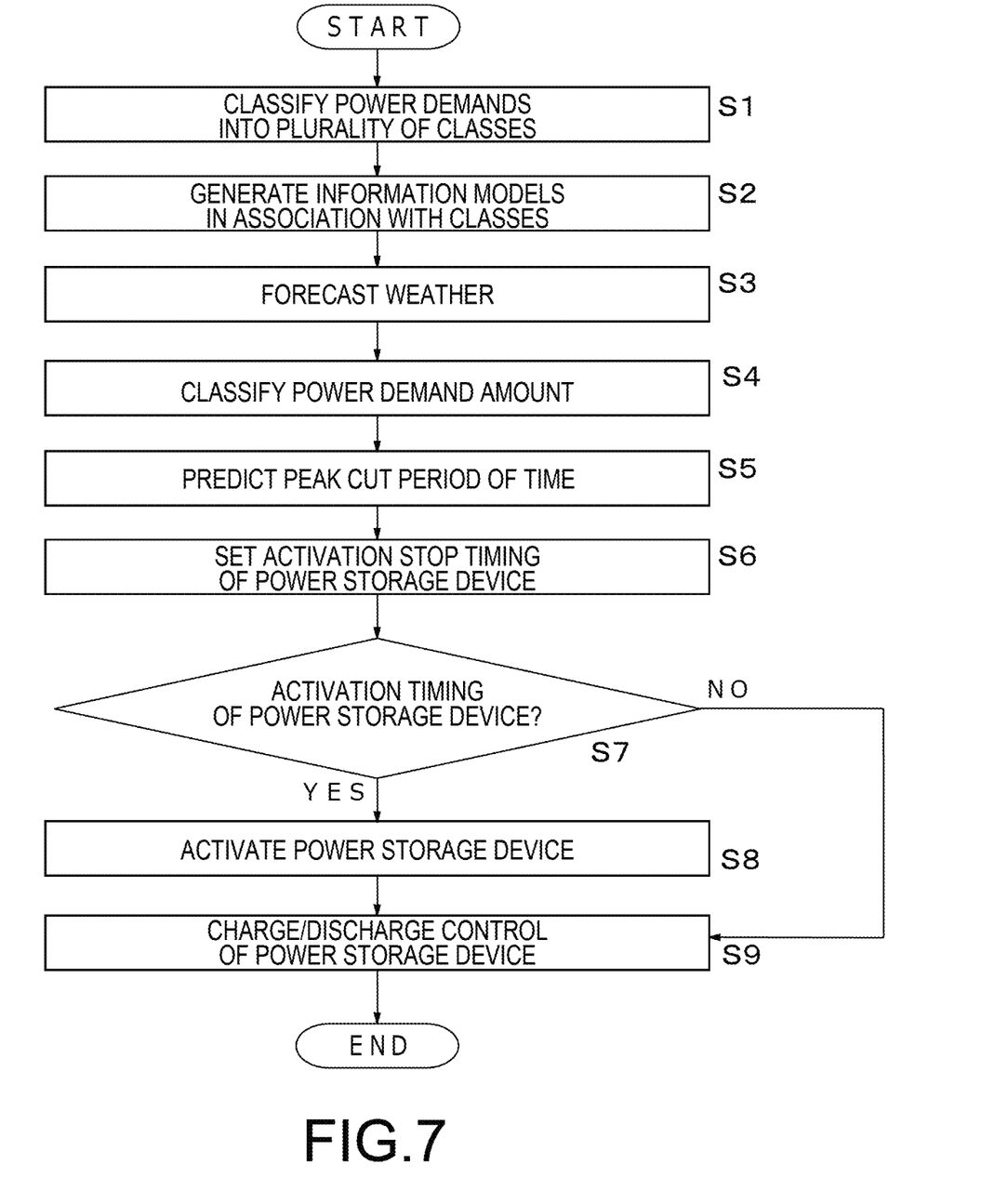
FIG. 7 is a flowchart illustrating an example of a processing operation of the power storage control unit in FIG. 2.

FIG. 7 is a flowchart illustrating an example of a processing operation of the power storage control unit 5 of FIG. 2. The processing in FIG. 7 is started before reaching the period of time predicted by the peak cut prediction unit 34, for example, in the morning before human activities become brisk. The power storage control unit 5 of FIG. 2 periodically or irregularly performs the processing of FIG. 7.

First, the class classification unit 31 classifies the power demand of the consumer 2 into the plurality of classes based on the past actual power demand value stored in the actual power demand value storage unit 7 (Step S1). Next, the model generation unit 32 generates the plurality of information models to predict the power demand amount of the consumer 2 in association with the plurality of classes, for the classified power demands, based on the past actual power generation amount and weather information, the power demand schedule information of the consumer 2, and the like (Step S2). As a result, the power demand amount is classified for each class.

Next, the weather forecast is performed by the weather simulation (Step S3). The process of Step S3 may be performed by the simulation execution unit 26 or may be performed by a different simulator from the simulation execution unit 26. Next, the power demand classification unit 33 classifies the power demand amount of the consumer 2 using the information models generated by the model generation unit 32 (Step S4).

Next, the peak cut prediction unit 34 predicts the period of time for the peak cut based on the power demand amount classified for each class (Step S5). Next, the stop timing determination unit 35 sets the activation stop timing to stop the control of the peak cut operation of the power storage device 4 based on the peak cut period of time predicted by the peak cut prediction unit 34 (Step S6).

Next, the charge/discharge control command unit 14 determines whether the activation timing of the power storage device 4 has arrived based on the peak cut period of time predicted by the peak cut prediction unit 34 (Step S7). When the activation timing has not yet arrived, the processing of FIG. 7 is ended. When a predetermined period has elapsed from the end, the processing of FIG. 7 is started again.

When it is determined in Step S7 that the activation timing of the power storage device 4 has arrived, the charge/discharge control command unit 14 transmits a discharge start command signal of the power storage device 4 to start charge/discharge of the power storage device 4 (Step S8). Next, charge/discharge control processing illustrated in detail in FIG. 8 is performed (Step S9), and then, the processing of FIG. 7 is ended.

Figure 8:
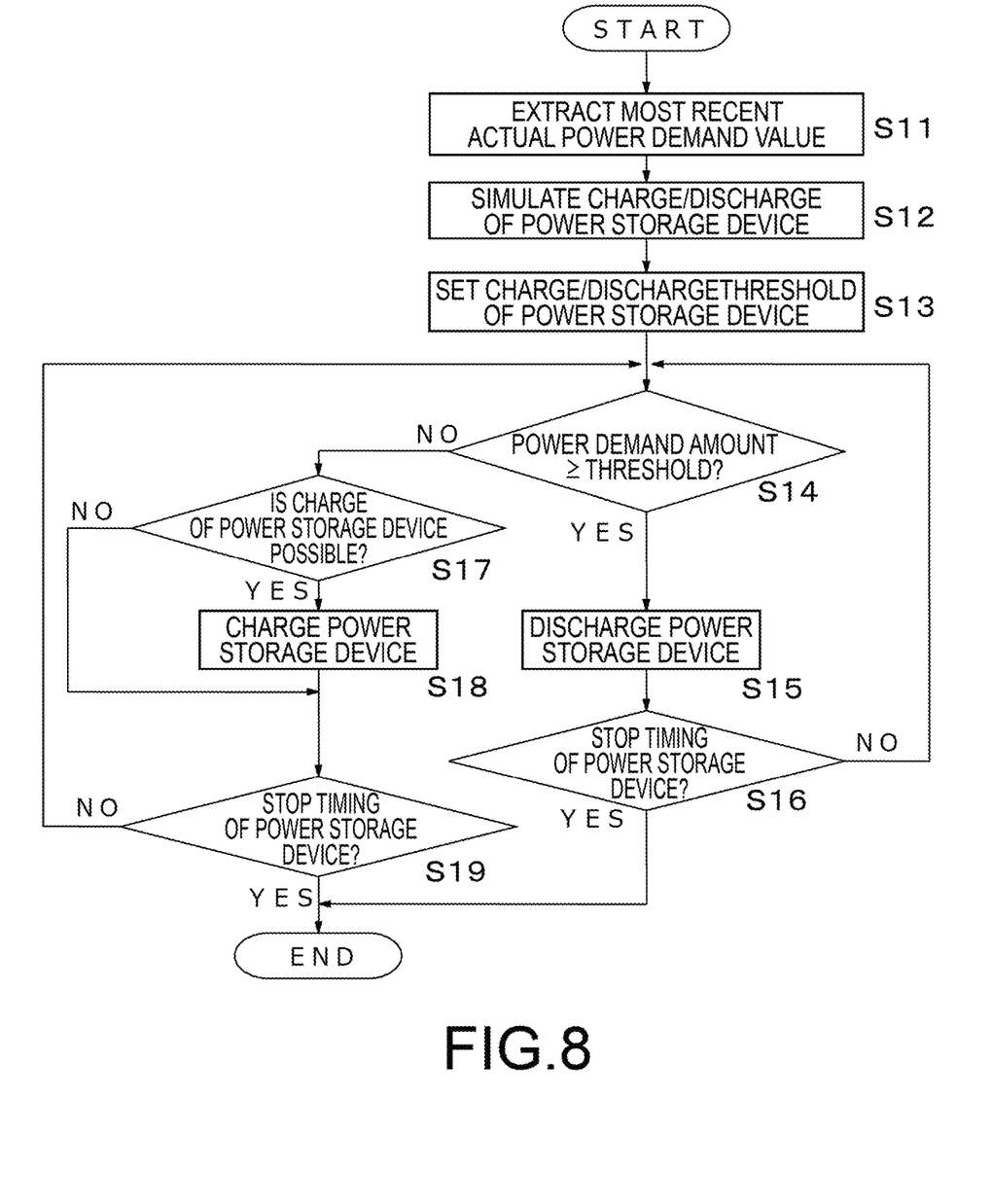
FIG. 8 is a flowchart illustrating an example of a processing operation of a charge/discharge control process.

FIG. 8 is a flowchart illustrating an example of a processing operation of the charge/discharge control processing. First, the extraction unit 25 extracts the most recent actual power demand value from the actual power demand value storage unit 7 (Step S11). Next, the simulation execution unit 26 simulates charge/discharge of the power storage device 4 using the most recent actual power demand value thus extracted, the power generation amount, and a weather forecast value (Step S12). Next, the threshold setting unit 28 sets the threshold to start charge/discharge of the power storage device 4 based on the peak cut effect obtained by the simulation performed by the simulation execution unit 26 (Step S13).

Next, the charge/discharge control command unit 14 determines whether the power demand of the consumer 2 is equal to or higher than the threshold (Step S14). If the power demand exceeds the threshold, a power demand (residual demand) corresponding to the amount exceeding the threshold is compensated with the discharge of the power storage device 4 (Step S15). At this time, the discharge from the power storage device 4 is performed within an output range of a power conditioning system (PCS). Thereafter, the stop timing determination unit 35 determines whether the activation stop timing to stop the control of the peak cut operation of the power storage device 4 has arrived (Step S16). If the stop timing has not arrived yet, the processes in Step S14 and the subsequent steps are repeated after a lapse of a predetermined time (for example, 30 minutes).

On the other hand, if it is determined in Step S14 that the power demand of the consumer 2 is lower than the threshold, the charge possibility determination unit 15 determines whether the charge of the power storage device 4 is possible (Step S17). The charge possibility determination unit 15 accesses the SoC storage unit 16 that stores the SoC of the power storage device 4 and performs the determination process in Step S17.

When it is determined in Step S17 that the charge is possible, the charge/discharge control command unit 14 charges the power storage device 4 within the output range of the PCS (Step S18). When the process of Step S18 is ended or when it is determined in Step S17 that the charge is not possible, the stop timing determination unit 35 determines whether the activation stop timing to stop the control of the peak cut operation of the power storage device 4 has arrived (Step S19). If the stop timing has not arrived yet, the processes in Step S14 and the subsequent steps are repeated after a lapse of a predetermined time (for example, 30 minutes).

In this manner, the period of time in which the power demand of the consumer 2 peaks is predicted, the threshold is set in accordance with the predicted period of time, and the power storage device 4 is discharged to compensate the power demand amount exceeding the threshold in the present embodiment. As a result, it is possible to efficiently operate the power storage device 4 and improve the peak cut effect. In addition, it is possible to prevent occurrence of a problem that the storage capacity of the storage battery becomes empty and it is difficult to perform discharge when the peak cut needs to be performed.

At least a part of the power control apparatus 1 described in the above embodiments may be configured by hardware or software. When configured by the software, a program to implement at least some functions of the power control apparatus 1 may be stored in a storage medium, such as a flexible disk and a CD-ROM, and then may be read and executed by a computer. The recording medium is not limited to a detachable storage medium, such as a magnetic disk and an optical disc, and may be a fixed recording medium, such as a hard disk and a memory.

In addition, the program to implement at least some functions of the power control apparatus 1 may be distributed through a communication line (including radio communication) such as the Internet. Further, the program that has been encrypted, modulated, or compressed, may be distributed through a wired line or a wireless line, such as the Internet, or may be stored in a recording medium and then may be distributed.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A power control apparatus comprising:
   a peak cut prediction unit that predicts a period of time to impose a restriction on power supply from a power system to a consumer based on a predetermined condition;
   a threshold setting unit that sets a predetermined threshold such that a power supply amount from the power system to the consumer does not exceed the threshold in the period of time predicted by the peak cut prediction unit; and
   a charge/discharge control command unit that stops power supply from the power system to the consumer and causes a power storage device to be discharged by an amount of demand power exceeding the threshold when demand power of the consumer reaches the threshold in the period of time predicted by the peak cut prediction unit,
   wherein the charge/discharge control command unit permits charge/discharge of the power storage device in the period of time predicted by the peak cut prediction unit.

2. The power control apparatus according to claim 1, wherein the charge/discharge control command unit stops charge/discharge of the power storage device at a time other than the period of time.

3. The power control apparatus according to claim 1, further comprising
a charge possibility determination unit that determines whether charge of the power storage device is possible when the demand power of the consumer is equal to or less than the threshold in the period of time predicted by the peak cut prediction unit,
wherein the charge/discharge control command unit charges the power storage device when the charge possibility determination unit determines that the charge of the power storage device is possible.

4. The power control apparatus according to claim 1, wherein
the charge/discharge control command unit confirms whether the demand power of the consumer has reached the threshold, within a predetermined period, every period of time in the period of time, and controls whether to cause the power storage device to be charged or discharged every period of time.

5. The power control apparatus according to claim 1, further comprising
a stop timing determination unit that determines whether the period of time predicted by the peak cut prediction unit has ended,
wherein the charge/discharge control command unit stops control of a power cut-off operation of the power storage device when the stop timing determination unit determines that the period of time has ended, and receives power supply from the power system in accordance with a power demand of the consumer.

6. The power control apparatus according to claim 1, wherein
the predetermined condition includes at least one of an actual power demand value, a power generation amount, weather observation information, weather forecast information, and power demand schedule information of the consumer.

7. The power control apparatus according to claim 1, further comprising:
a class classification unit that classifies a power demand of the consumer into a plurality of classes;
a model generation unit that generates a plurality of information models to predict a power demand amount of the consumer in association with the plurality of classes based on weather observation information and power demand schedule information of the consumer; and
a power demand classification unit that classifies a future power demand amount of the consumer into a plurality of classes based on the power demand schedule information of the consumer, weather forecast information, and the plurality of information models,
wherein the peak cut prediction unit predicts the period of time based on the power demand amount classified by the power demand classification unit.

8. The power control apparatus according to claim 1, further comprising:
a first storage unit that stores past actual power demand values of the consumer;
a second storage unit that stores weather forecast information;
an extraction unit that extracts some actual power demand values with newer time information from among the actual power demand values stored in the first storage unit; and
a simulation execution unit that simulates an operation of causing the power storage device to be charged or discharged such that a power supply amount from the power system to the consumer does not exceed the threshold, based on the some actual power demand values and the weather forecast information stored in the second storage unit,
wherein the threshold setting unit sets the threshold based on a simulation result obtained by the simulation execution unit.

9. The power control apparatus according to claim 8, further comprising
a third storage unit that stores a power generation amount of a power generation device,
wherein the simulation execution unit simulates the operation of causing the power storage device to be charged or discharged based on the some actual power demand values, the weather forecast information stored in the second storage unit, and the power generation amount stored in the third storage unit.

10. A power control method comprising:
predicting a period of time to impose a restriction on power supply from a power system to a consumer based on a predetermined condition;
setting a predetermined threshold such that a power supply amount from the power system to the consumer does not exceed the threshold in the predicted period of time; and
stopping power supply from the power system to the consumer and causing a power storage device to be discharged by an amount of demand power exceeding the threshold when demand power of the consumer reaches the threshold in the predicted period of time,
wherein the stopping of the power supply permits charge/discharge of the power storage device in the predicted period of time.

11. The power control method according to claim 10, wherein
the stopping of the power supply stops charge/discharge of the power storage device at a time other than the period of time.

12. The power control method according to claim 10, further comprising
determining whether charge of the power storage device is possible when the demand power of the consumer is equal to or less than the threshold in the predicted period of time,
wherein the power storage device is charged when it is determined that the charge of the power storage device is possible.

13. The power control method according to claim 10, wherein
the stopping of the power supply confirms whether the demand power of the consumer has reached the threshold, within a predetermined period, every period of time in the period of time, and controls whether to cause the power storage device to be charged or discharged every period of time.

14. The power control method according to claim 10, further comprising
determining whether the predicted period of time has ended, wherein control of a power cut-off operation of the power storage device is stopped when it is determined that the period of time has ended, and receives power supply from the power system in accordance with a power demand of the consumer.

15. The power control method according to claim 10, wherein
the predetermined condition includes at least one of an actual power demand value, a power generation amount, weather observation information, weather forecast information, and power demand schedule information of the consumer.

16. The power control method according to claim 10, further comprising:
classifying a power demand of the consumer into a plurality of classes;
generating a plurality of information models to predict a power demand amount of the consumer in association with the plurality of classes based on weather observation information and power demand schedule information of the consumer; and
classifying a future power demand amount of the consumer into a plurality of classes based on the power demand schedule information of the consumer, weather forecast information, and the plurality of information models,
wherein the period of time is predicted based on the classified power demand amount.

17. The power control method according to claim 10, further comprising:
storing past actual power demand values of the consumer, storing weather forecast information;
extracting some actual power demand values with newer time information from among the stored actual power demand values; and
simulating an operation of causing the power storage device to be charged or discharged such that a power supply amount from the power system to the consumer does not exceed the threshold, based on the some actual power demand values and the stored weather forecast information,
wherein the threshold is set based on a simulation result.

18. The power control method according to claim 17, further comprising
storing a power generation amount of a power generation device,
wherein the operation of causing the power storage device to be charged or discharged is simulated based on the some actual power demand values, the stored weather forecast information, and the stored power generation amount.

19. A recording medium that stores a program, the program that causes a computer to execute:
predicting a period of time to impose a restriction on power supply from a power system to a consumer based on a predetermined condition;
setting a predetermined threshold such that a power supply amount from the power system to the consumer does not exceed the threshold in the predicted period of time; and
stopping power supply from the power system to the consumer and causing a power storage device to be discharged by an amount of demand power exceeding the threshold when demand power of the consumer reaches the threshold in the predicted period of time,
wherein the stopping of the power supply permits charge/discharge of the power storage device in the predicted period of time.

20. The recording medium according to claim 19, wherein
the stopping of the power supply stops charge/discharge of the power storage device at a time other than the period of time.

* * * * *